Jan. 16, 1951      T. BROWN      2,538,143
POWER LIFT

Original Filed Feb. 1, 1943      2 Sheets-Sheet 1

INVENTOR.
THEOPHILUS BROWN
ATTORNEYS

Patented Jan. 16, 1951

2,538,143

UNITED STATES PATENT OFFICE 2,538,143

POWER LIFT

Theophilus Brown, Moline, Ill., assignor to Deere & Company, Moline, Ill., a corporation of Illinois Original application February 1, 1943, Serial No. 474,404, now Patent No. 2,416,373, dated February 25, 1947. Divided and this application November 30, 1945, Serial No. 632,076

18 Claims. (Cl. 60—97)

This application is a division of my copending application, Serial No. 474,404, filed February 1, 1943, now U. S. Patent 2,416,373, issued February 25, 1947.

The present invention relates generally to power lift mechanism for agricultural tractors and the like, and more particularly to hydraulic mechanism including two separately operable ram units. The object and general nature of the present invention is the provision of hydraulic mechanism including a pair of ram units with control means therefor so constructed and arranged that the ram units may be simultaneously operated and controlled or operated and controlled separately or individually. A further feature of this invention is the provision of a pair of ram units each having means for returning the controlling valve to a neutral position after a given amount of extension of the ram unit.

A further feature of this invention is the provision of hydraulic mechanism including a pair of ram units, each having its own individual control, with means shiftable from one position, in which both controls are operated together, into another position in which the controls may be operated individually. More specifically, it is a feature of this invention to provide a hydraulic arrangement of this kind in connection with a single source of power, such as a positive displacement pump, with a bleeder valve arranged in the system for diverting a quantity of fluid when only one ram unit is extended, the bleeder valve being adapted to be automatically closed when both ram units are operated together, whereby the time of operation, whether both units together, or only one, is the same in both cases or substantially so.

These and other objects and advantages of the present invention will be apparent to those skilled in the art after a consideration of the following detailed description, taken in conjunction with the accompanying drawings, in which.

Figure 1:
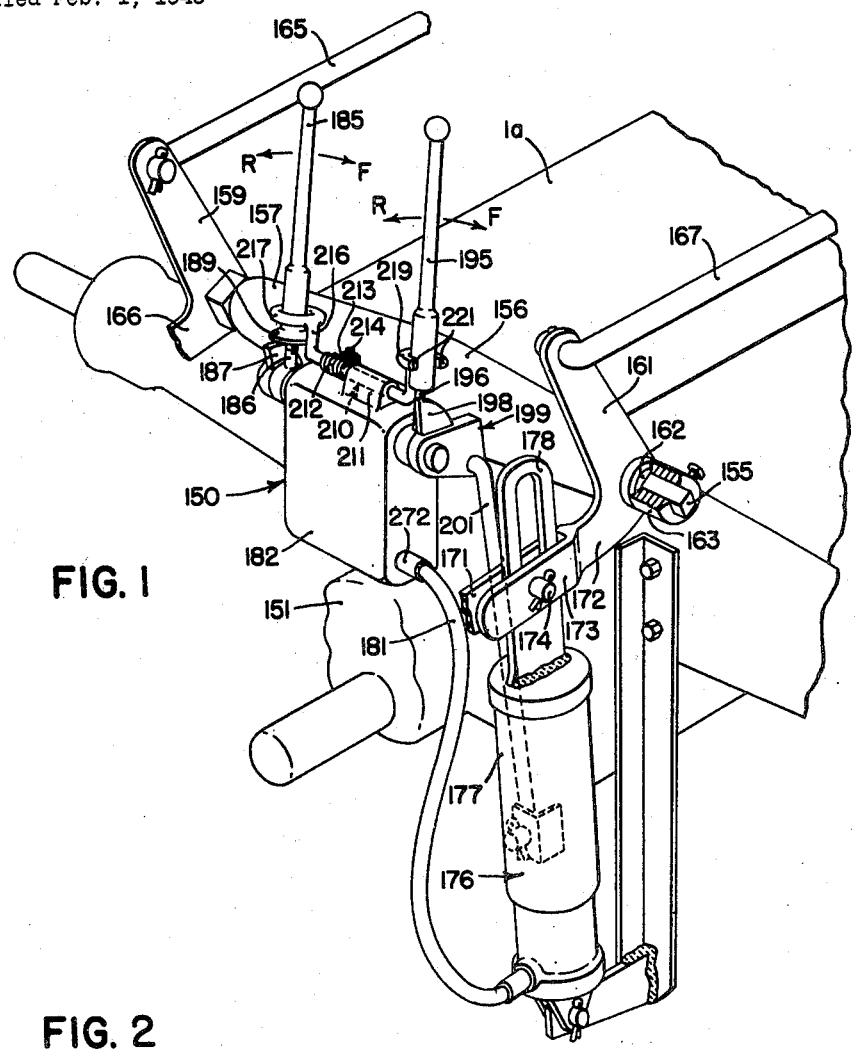
Figure 1 is a perspective view of the rear portion of an agricultural tractor equipped with hydraulic apparatus of the present invention in which two ram units are associated with a single source of fluid pressure such as a pump, with optionally controlled means for operating the two ram units either separately or simultaneously.
Figure 2:
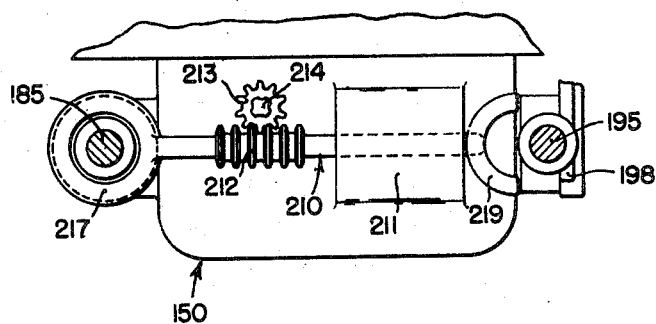
Figure 2 is a fragmentary top view of the shiftable valve control handle.

Referring now to the drawings, particularly Figure 1, the structure chosen to illustrate the principles of the present invention includes a main hydraulic power lift unit 150 adapted to operate a pair of implement controlling members suitably connected with a tool or tools, such as cultivators or the like, whereby the tool or tools may be raised or lowered simultaneously or independently. This mechanism is similar to the mechanism shown in my United States Patent No. 2,337,638, issued December 28, 1943, to which reference may be made if necessary. In the present form of the invention the hydraulic unit 150 is substantially identical with the hydraulic unit disclosed and claimed in the co-pending application filed August 6, 1942, by Wayne H. Worthington, Serial No. 453,907, now U. S. Patent 2,403,422. It will therefore be unnecessary to completely describe the unit 150 except to say that a gear pump 151 serves as a source of fluid under pressure for delivering oil under control of suitable valve mechanism to a cylinder and piston or ram unit arranged similar to the power lift mechanism shown in the prior United States patent to E. McCormick et al., No. 2,107,760, dated February 8, 1938, to which reference may be made if necessary. The piston of such a unit is connected through an arm to a transverse rockshaft 155 that is mounted for rocking movement in a housing 156 having lateral extensions 157, there being only a single rockshaft in this form of the invention. Preferably, the rockshaft 155 is square in cross section but it may be formed otherwise, if desired. At the left side of the tractor, indicated by the reference numeral 1a, an arm 159 is fixed by any suitable means to the left end of the rockshaft 155, and at the other end of the latter, a bell crank 161 is mounted for rocking movement, preferably on a journal or bushing 162 which provides for movement of the bell crank 161 relative to the rockshaft 155. The bell crank 161 is held in position between the outer end of the right lateral extension 157 and a collar 163 fixed to the rockshaft 155. Connected to the left arm 159 is a cultivator lift pipe 165, and the arm 159 may have a rearward extension 166 to which rear rigs may be connected. The bell crank 161 at the other side of the tractor is also connected to a cultivator push pipe 167, and likewise the bell crank 161 is provided with a rearward extension 171 to which other rear rigs may be connected if desired, the extension 171 forming a part of the rearwardly extending arm 172 that includes a bifurcated portion 173 which is apertured to receive a pivot pin 174. An auxiliary ram unit 176 is anchored at its lower end to a bracket connected to or carried by the tractor 1a, and the movable piston unit 177 of the ram unit 176, is connected by a link or strut 178 to the pivot 174. Fluid flows to the ram unit 176 through a flexible hose connection 181, connected into the valve box 182 that forms a part of the hydraulic unit 150.

The valve mechanism enclosed in the casing 182 and the operating and controlling means therefor is, in this form of the invention, quite similar to the valve means shown in my parent application, identified above, and the valve mechanism shown in the above-mentioned Worthington co-pending application. It is therefore sufficient to note that, in this form of the invention, the hydraulic unit 150 incorporates means that causes fluid to be directed under pressure into the cylinder in which the piston controlling the rockshaft 155 is movable, such valve mechanism also incorporating similar means controlling the flow of fluid to and from the auxiliary ram unit 176. As best shown in Figure 1, the first mentioned control means includes a hand lever 185 having its lower section in screw-threaded engagement with the upper end of an arm 186 that is connected directly to and forms a part of the valve mechanism controlling the ram unit that rocks the rockshaft 155. A return cam 187 is fixed to a shaft carried by the casing 182 and is operatively connected with the piston associated with the rockshaft 155 so as to be moved in a forward direction so as to engage a flange 189 formed on the hand lever 185 and return the latter to a neutral position when the piston reaches a given point in its forward movement, depending upon the adjustment of the member 185 on the member 186. The hand lever for controlling the auxiliary ram unit 176 is indicated in Figure 1 by the reference numeral 195 and includes a lower section that is threaded onto an arm 196 that is connected directly with the valve mechanism controlling the flow of fluid to and from the ram 176. A return cam 198 is formed on a rockable member 199 that is connected by a link 201 with the piston section 178 of the ram 176, whereby when the valve is in a position permitting fluid to flow from the ram back to the sump, the resulting movement of the piston section causes the member 199 to rock in a direction to carry the cam 198 into engagement with the lower end of the hand lever 195 and to return the latter to a neutral position at a point in the cycle of operation which depends upon the position of adjustment of the member 195 on the threaded arm 196. The particular valve mechanism incorporated in the hydraulic unit 150 is shown diagrammatically in Figure 3 and will be referred to in detail below. It will be understood that the particular details of the valve mechanism do not per se form a part of the present invention except in combination with other novel features.

The valve operating handle 185 and the member 186 on which it is mounted are disposed for lateral movement toward and away from the casing 182 while maintaining operative connection with the valve mechanism in the casing 182, and the flange 189 is of sufficient radial extent so that in any position of the member 185, 186 the cam 187 is adapted to engage the flange 189 and restore the valve handle 185 to its neutral position, as described above. A connecting member, indicated in its entirety by the reference numeral 210, is mounted for sliding and rocking movement on the casing 182, the latter having one or more apertured lugs in which the central part of the member 210 is preferably disposed. The left end of the member 210 has a grooved section 212 which meshes with a pinion 213 disposed on the upper end of a bleeder valve shaft 214, there preferably being a splined or similar connection between the pinion 213 and the valve stem 214 for a reason which will appear below. At the left of the grooved section 212 the member 210 carries an arched portion 216 which terminates in a loop 217 disposed about the lower portion of the valve handle 185 in a fairly snug fitting relation but with sufficient looseness that the rocking movement of the valve handle 185 in a fore and aft direction causes the member 210 to rock about its axis of support in the lug 211. At the other end of the member 210 a forked section 219 is disposed and has arms 221 adapted to embrace the other valve operating handle 195. The member 210 is mounted for sliding movement in a lateral direction from a position in which the arms 221 clear the valve handle 195 into a position in which the latter valve is operated whenever the member 210 is rocked about its axis of support on the casing 182. The member 210 is shifted laterally by the lateral shifting movement of the valve operating member 185, 186, and whenever the member 210 is shifted the pinion 213 and the valve stem 214 is rotated, and this action is utilized according to the present invention to secure a readjustment of the hydraulic system to provide for operating the two ram units over their full stroke in substantially the same time that either may be operated singly.

Figure 3:
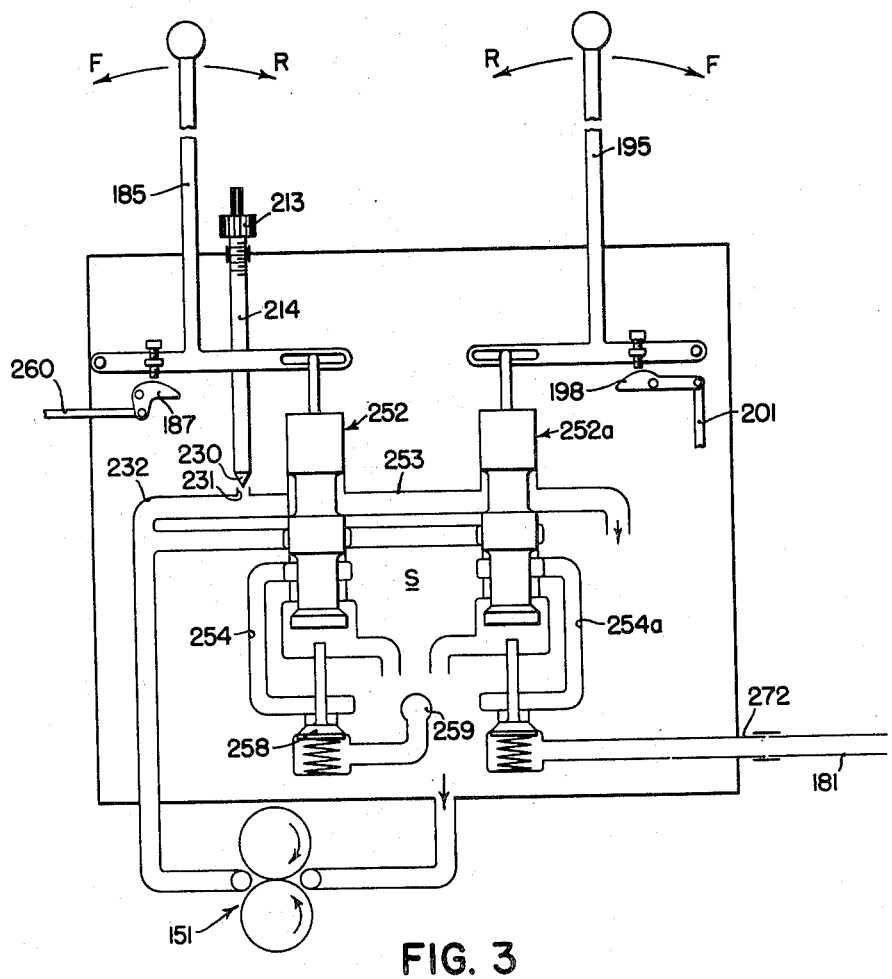
Figure 3 is a diagrammatic view of the valve mechanism.

The valve mechanism incorporated in the unit 150 is shown diagrammatically in Figure 3 and, as mentioned above, is of substantially the same construction as is shown and claimed in the Worthington co-pending application, identified above. Referring now to Figure 3, rocking the handle 185 in the direction indicated F in Figure 1 (forward), raises a valve 252 and closes off an idle passage 253 leading to a sump S and diverts oil under pressure through a passage 254 past a check valve 258 and out into a passage 259 to the ram unit that rocks the rockshaft 155. Rocking the handle 185 in the other direction R (rearwardly) causes the lower end of the valve 252 to open the check valve 258, permitting oil to flow out of the ram unit associated with the rockshaft 155 through passages 259 and 254 back to the sump S.

When the valve lever 185 is swung in direction R to lower the valve 252 and fluid flows from the ram unit through passages 259 and 254 to the sump S, the resulting movement of the piston of the ram unit permits the rockshaft 155 to rock in a direction to swing the arm 159 rearwardly, thus lowering the tools associated therewith. A link 260 is connected to be shifted whenever the rockshaft 155 rocks in a rearward direction and this, in turn, rocks the return cam member 187 (Figures 1 and 3) which, as described above, engages the flange 189 and returns the valve handle 185, and the associated valve mechanism, to a neutral or intermediate position. The parts are so arranged that when the rockshaft 155 reaches a given point in the lowering direction, depending on the adjustment of the handle 185 on the arm 186, the cam member 187 acts against the flange 189 and the arm 186 and raises the valve 252 to its neutral position, thus automatically terminating the lowering movement of the rockshaft 155 and associated tools.

The other valve 252a is controlled by the valve handle 195 and the associated arm 196 and, in general, operates in the same way as described above in connection with the valve 252, namely, either to direct fluid under pressure through passages 254a and 272 to the flexible hose 181 leading to the auxiliary ram unit 176, or to permit fluid to flow from the latter unit back to the sump S. Acting through the link 201, when the valve 252a is lowered to permit fluid to flow from the ram unit 176, the resulting movement of the piston element 178 and the link 201 causes the cam 198 to approach the lower end of the valve handle 195, thus serving to automatically return the valve 252a to a neutral position whenever the piston of the ram unit 176 moves to a predetermined position, depending upon the adjustment of the member 195 on the member 196.

It was described above how the left valve operating handle 185 may be shifted laterally into a position to disengage the section 219 of the laterally shiftable member 210 from the valve operating handle 195. In this position of the parts, either of the valves 252 and 252a may be operated separately, as may be desired. For example, where right and left hand cultivator rigs are connected with the arms 159 and 161, the outfit may be employed for cultivating point rows, one valve operating handle being used to raise the tools at one side while permitting the outfit to travel a further distance before operating the other valve handle to raise the tools at the other side.

It may also be desirable to raise and lower the tools at the same time, and according to the present invention this may be done easily and conveniently merely by shifting the valve handle 185 to the right, which acts through the shiftable member 210 to move the section 219 into engagement with the other valve handle 195. Then by rocking either valve handle 185 or 195 forwardly, both valves 252 and 252a will be placed in a position to raise the tools at both sides of the tractor at the same time, and swinging either valve handle 185 or 195 rearwardly will therefore actuate both valves to lower both sets of tools.

Where the tractor is equipped with hydraulic power lift mechanism of the type described above, namely, one or more ram units with a pump of the positive displacement type driven at more or less a constant speed, the simultaneous connection of both ram units to the single source of power would result in operation at approximately twice the time that would occurr when either of the ram units is operated independently, for the reason that the simultaneous operation of both units requires twice as much oil as the separate operation of one unit. According to the present invention, I provide means whereby the length of time required to operate either ram unit is substantially the same as the length of time required to operate both together. Briefly, the present invention contemplates installing a bleeder valve in the high pressure line and to control the open and closed position of the bleeder valve by the shifting movement of the member 210 so that an amount of oil is diverted from the system when only one ram unit is operated, but when both ram units are operated simultaneously the bleeder valve is closed so as to utilize the full capacity of the pump to raise both units.

As best shown in Figure 1, the upper end of the bleeder valve stem 214 is threaded, the threads being fairly coarse and the corresponding portion of the casing receiving the valve stem 214 being correspondingly threaded. The lower end of the stem 214 is formed as a needle valve, as indicated at 230 and cooperates with a bleeder opening 231 formed in the passage 232 leading from the pump to the high pressure passage 253. Thus, whenever the member 210 is shifted in one direction or the other, the valve stem 214 is raised or lowered, opening or closing the bleed passage 231. The capacity of the bleed is such that when the valve is open, sufficient oil is diverted so that one ram unit may be operated through its full stroke in approximately the same time that both ram units are operated when the valve is closed. To adjust the bleeder valve, the pinion 213 may be raised on the splined upper end of the stem 214 and out of mesh with the grooved section 212 to permit turning the pinion to a new position of adjustment before remounting it on the upper end of the stem 214.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A power lift device for agricultural tractors and the like, comprising a pair of ram units normally separately operable, each having controlling valve means therefor and a part for operating the valve means, a separate hand lever for operating each valve part, one of said hand levers being movable in one plane into either of two positions and also movable in either position in another plane generally transversely relative to said one plane in a direction to operate the associated valve part, and means movable with said hand lever when the latter is moved in said one plane into engagement with the other hand lever, said means being then movable with said one hand lever when the latter is moved in said other plane, whereby both of said hand levers may be operated together.

2. A power lift device for agricultural tractors and the like, comprising a pair of ram units normally separately operable, each having controlling valve means therefor, optionally operable means adapted to actuate said valve means simultaneously or separately, and means controlled by said optionally operable means for maintaining substantially constant the application of power deliverable to each of said ram units, according to whether they are actuated only one at a time or simultaneously actuated.

3. A power lift device for agricultural tractors and the like, comprising a single source of fluid pressure, a pair of ram units normally separately operable, each including controlling valve means therefor, optionally operable means adapted to actuate said valve means either simultaneously or separately, a bleeder valve movable from open to closed position and adapted when open to divert a quantity of fluid when said ram units are operated separately, and means actuated by said optionally operable means for closing said bleeder valve when both of said ram units are operated simultaneously.

4. A power lift device for agricultural tractors and the like having a source of fluid pressure, comprising a pair of ram units normally separately operable, each having controlling valve means therefor and a part for operating the valve means, a fluid connection between said source and said valve means, a separate member for operating each valve part, one of said members being movable in two planes, means operatively connected with said one member and shiftable into a position engageable with the other member whereby movement of said one member serves to operate both members, and fluid flow modifying means actuated by movement of said shiftable means out of said position for diverting a portion of the fluid flow from said source when said valve parts are operated separately.

5. In a valve mechanism including two valve units, each having a separate movable valve controlling member and one of said members being movable into either of two positions and also movable in either position in a direction to operate the associated valve part, means movable with said one member into engagement with the other member so as to provide for operating both of said members by moving either of them, a source of fluid under pressure, connections between said source and said valve units whereby fluid flow from said source is controlled, and means actuated by said movable means for diverting a portion of said flow when only one of said valve units is operated.

6. In an agricultural machine or the like, a pair of normally separately operable control members movable normally in parallel spaced apart planes, and one of said members being movable in a transverse direction into either of two positions, a part having one end interconnected with said one member and movable with said one member from one of said transverse positions to the other, the other end of said part having means engageable with the other control member in one position of said one control member whereby both of said members will be operated when said one member is operated, and a third member interconnected with said part and shiftable from one position to another when said part is moved.

7. In an agricultural machine or the like, a pair of normally separately operable control levers movable normally in parallel spaced apart planes, and one of said levers being movable in a transverse direction into either of two positions, a part having one end interconnected with said one lever and movable with said one lever from one of said transverse positions to the other, the other end of said part having means engageable with the other control lever in one position of said one control lever whereby both of said levers will be operated when said one lever is operated, and a support upon which said levers are mounted for movement about a common axis and said part interconnecting said levers being mounted for movement about an axis adjacent said first axis.

8. The invention set forth in claim 7, further characterized by a hydraulic bleed valve unit operatively connected with said part and opened and closed by movement of the latter corresponding to movement of said one member between said transverse positions.

9. A power lift device for agricultural tractors and the like, comprising a pair of ram units normally separately operable, each having controlling valve means therefor, means for operating both of said valve means simultaneously so as to operate both of said ram units, simultaneously, and means controlled by said operating means for retarding the operation of either of said ram units when one is operated without the other.

10. A power lift device for agricultural tractors and the like, comprising a pair of ram units normally separately operable, each having controlling valve means therefor, mechanism for operating said valve means including a part shiftable from one position, in which either of said valve means may be operated separately, into another position in which said two valve means are operated simultaneously, and means controlled by movement of said part for maintaining substantially constant the rate at which fluid is supplied to each of said ram units.

11. In an agricultural implement, a support, a pair of levers mounted thereon in spaced apart relation for optionally independent rocking movement about a common axis, a connecting part extending between said levers and mounted on said support for both transverse sliding movement and rocking movement about an axis disposed co-directionally with respect to said first axis, one of said levers also being mounted on said support for lateral shifting movement toward and away from the other lever, means on the end of said part connected with said one lever to cause said part to be both rocked and shifted laterally with said one part, and means on the other end of said part to embracingly connect the latter with said other lever when said one lever and said part are shifted toward said other lever, whereby when the two levers are so connected rocking of said one lever acts through said connecting part to rock the other lever.

12. In an agricultural implement, a support, a pair of levers mounted thereon in spaced apart relation for optionally independent rocking movement about a common axis, a connecting part extending between said levers and mounted on said support for both transverse sliding movement and rocking movement about an axis disposed co-directionally with respect to said first axis, one of said levers also being mounted on said support for lateral shifting movement toward and away from the other lever, an arm portion on one end of said part embracing said one lever so as to cause said part to be both rocked and shifted laterally with said one part, and a fork portion on the other end of said part to embracingly connect the latter with said other lever when said one lever and said part are shifted toward said other lever, whereby when the two levers are so connected rocking of said one lever acts through said connecting part to rock the other lever.

13. A power lift device for agricultural tractors and the like, comprising a support, a single source of fluid pressure, a pair of ram units normally separately operable, each including controlling valve means therefor, means for operating said controlling valve means including a pair of levers mounted on said support in spaced apart relation for optionally independent rocking movement about a common axis, a connecting part extending between said levers and mounted on said support for both transverse sliding movement and rocking movement about an axis disposed co-directionally with respect to said first axis, one of said levers also being mounted on said support for lateral shifting movement toward and away from the other lever, a bleeder valve movable from open to closed position and adapted when open to divert a quantity of fluid when said ram units are operated separately, means on the end of said part connected with said one lever to cause said part to be both rocked and shifted laterally with said one part, means on the other end of said part to embracingly connect the latter with said other lever when said one lever and said part are shifted toward said other lever, whereby when the two levers are so connected rocking of said one lever acts through said connecting part to rock the other lever, and means on said part for closing said bleeder valve when both of said ram units are operated simultaneously.

14. For use with a power lift device which includes a fluid pump, a ram unit, and control means including a valve controlling part, the improvement which comprises a second ram unit adapted to be connected to receive fluid under pressure from said pump, control means for said second ram unit including a valve controlling part, means for operating both of said valve controlling parts simultaneously so as to operate both of said ram units, simultaneously, and means controlled by said operating means for retarding the operation of either of said ram units when one is operated without the other.

15. For use with a power lift device which includes a fluid pump, a ram unit, and control means including valve means, the improvement which comprises a second ram unit adapted to be connected to receive fluid under pressure from said pump, control means for said second ram unit including valve means, mechanism for operating said two valve means including a part shiftable from one position, in which said two valve means may be operated separately, into another position in which said two valve means are operated simultaneously, and means controlled by movement of said part from said other position to said one position for diverting from said ram units a portion of the power that is normally deliverable to said units when they are operated simultaneously.

16. For use with an agricultural tractor which includes a single source of fluid pressure, a ram unit, and valve means controlling the flow of fluid to said ram unit, the improvement which comprises a second ram unit adapted to receive fluid from said source, valve means for controlling the flow of fluid to said second ram unit, means for operating said controlling valve means including a pair of levers adapted to be mounted on the tractor in spaced apart relation for optionally independent rocking movement about a common axis, a connecting part extending between said levers and adapted to be mounted on the tractor for both transverse sliding movement and rocking movement about an axis disposed co-directionally with respect to said first axis, one of said levers also being adapted to be mounted on the tractor for lateral shifting movement toward and away from the other lever, a bleeder valve movable from open to closed position and adapted when open to divert a quantity of fluid when said ram units are operated separately, means on the end of said part connected with said one lever to cause said part to be both rocked and shifted laterally with said one part, means on the other end of said part to embracingly connect the latter with said other lever when said one lever and said part are shifted toward said other lever, whereby when the two levers are so connected rocking of said one lever acts through said connecting part to rock the other lever, and means on said part for closing said bleeder valve when both of said ram units are operated simultaneously.

17. A power lift device for agricultural tractors and the like having a fluid pump, an inlet and an outlet for said pump, and a reservoir with which said inlet is in communication, said device comprising a pair of ram units connected with said pump outlet and normally separately operable, each having controlling valve means therefor, optionally operable means adapted to actuate said valve means simultaneously or separately, and means controlled by said optionally operable means for diverting some of the fluid from the pump outlet to said reservoir when actuating said valve means separately.

18. A power lift device for agricultural tractors and the like having a fluid pump, an inlet and an outlet for said pump, and a reservoir with which said inlet is in communication, said device comprising a pair of ram units connected with said pump outlet and normally separately operable, each having controlling valve means therefor, mechanism for operating said valve means including a part shiftable from one position, in which said valve means may be operated separately, into another position in which said two valve means are operated simultaneously, controllable means for diverting a portion of the fluid from said pump outlet to said reservoir, and means controlled by movement of said part between said positions for actuating said controllable fluid-diverting means.

THEOPHILUS BROWN.

REFERENCES CITED

The following references are of record in the file of this patent:

UNITED STATES PATENTS

| Number | Name | Date |
|---|---|---|
| 387,799 | Moody | Aug. 14, 1888 |
| 1,584,358 | Dement | May 11, 1926 |
| 1,623,575 | Campbell | Apr. 5, 1927 |
| 1,788,027 | May | Jan. 6, 1931 |
| 1,843,425 | Karsten | Feb. 2, 1932 |
| 2,011,894 | Etnyre | Aug. 20, 1935 |
| 2,160,596 | LeBleu | May 30, 1939 |
| 2,243,364 | Trautman | May 27, 1941 |
| 2,264,575 | Knapp | Dec. 2, 1941 |
| 2,265,260 | Argo | Dec. 9, 1941 |
| 2,311,516 | Brown | Feb. 16, 1943 |
| 2,337,638 | Brown | Dec. 28, 1943 |
| 2,419,908 | Mott | Apr. 29, 1947 |